United States Patent [19]
Ledwell

[11] Patent Number: 5,690,465
[45] Date of Patent: Nov. 25, 1997

[54] CARCASS PICK UP AND DELIVERY MOTOR VEHICLE

[75] Inventor: Steven H. Ledwell, Texarkana, Tex.

[73] Assignee: Ledwell & Son Enterprises, Inc., Texarkana, Tex.

[21] Appl. No.: 541,117

[22] Filed: Oct. 11, 1995

[51] Int. Cl.⁶ ........................................ B65F 3/00
[52] U.S. Cl. ........................ 414/408; 414/495; 414/501
[58] Field of Search ........................ 414/406, 407, 414/408, 471, 487, 489, 495, 501, 527; 298/11

[56] References Cited

U.S. PATENT DOCUMENTS

| | | | |
|---|---|---|---|
| 2,105,329 | 1/1938 | Orlowsky | 214/78 |
| 2,965,254 | 12/1960 | Bowles | 414/501 |
| 3,090,514 | 5/1963 | Black, Sr. et al. | 414/495 |
| 3,140,787 | 7/1964 | Clar | 414/408 |
| 3,175,712 | 3/1965 | Herpich et al. | 414/407 |
| 3,202,305 | 8/1965 | Dempster et al. | 214/302 |
| 3,259,255 | 7/1966 | Cresci | 414/495 X |
| 3,619,007 | 11/1971 | Phillips | 298/11 |
| 3,762,586 | 10/1973 | Updike, Jr. | 414/501 X |
| 3,837,512 | 9/1974 | Brown | 214/302 |
| 3,921,839 | 11/1975 | Herpich | 414/406 X |
| 4,149,642 | 4/1979 | Schneider | 414/523 |
| 4,211,745 | 7/1980 | Boyd | 414/408 X |
| 4,647,267 | 3/1987 | Hund, Jr. | 414/408 |
| 4,854,406 | 8/1989 | Appleton et al. | 414/406 X |
| 4,952,111 | 8/1990 | Callahan | 414/111 |
| 5,118,244 | 6/1992 | Cook | 414/528 |

FOREIGN PATENT DOCUMENTS 0870261  10/1981  U.S.S.R. ........................ 414/408

OTHER PUBLICATIONS

Brochure entitled "Hallco Live Floor for the Forest Products Industry" Hallco Manufacturing Company, Inc., Seattle, WA.

Primary Examiner—James W. Keenan
Attorney, Agent, or Firm—Dougherty & Hessin, P.C.

[57] ABSTRACT

A specialized vehicle for pickup, transport and delivery of animal carcasses for selected processing. The vehicle includes a combination of implementary devices such as an arcuate, articulated front end fork lift assembly pivotable from behind the operating cab, a rear truck bed mounted on a scissors elevator assembly, a truck bed moving floor for rearward off-loading, specialized truck bed tailgate control, and washing and sanitizing fixtures adjacent the forklift for final clean out of carcass collection boxes.

15 Claims, 7 Drawing Sheets

CARCASS PICK UP AND DELIVERY MOTOR VEHICLE

BACKGROUND OF THE INVENTION

1. Field of the Invention

The invention relates generally to a motor vehicle and attendant structure for pick up of the contents of animal carcass depositories for hauling to a designated central location for off-loading and transport to a rendering facility.

2. Description of the Prior Art

Key features of the present invention may be identified in the prior art since many of the basic concepts are taught in individual patents. Thus, the patent to Dempster et al., U.S. Pat. No. 3,202,305, is a well-known teaching that is directed to a front end, overhead loading mechanism wherein a pair of lifting arms function to move a load upward and rearward over the vehicle cab for deposit in the vehicle body or bed. This is an old and well-known device that has been used for pickup and hauling of waste materials for a number of years. Also, U.S. Pat. No. 5,118,244 teaches a truck body structure having a driven moving floor which functions for rearward self-unloading of cargo material. This device is particularly useful for hauling and delivery of fungible materials as the truck body floor mechanism can be actuated to move material rearward for off-loading. No prior art has been discovered that contemplates the particular carcass delivery function of the present invention, and there is no prior art that teaches the combination of basic elements that carry out the functions of front end loading, truck bed hoist and rear gate off-loading as utilized in the present invention.

SUMMARY OF THE INVENTION

The present invention relates to an improved form of motor vehicle that includes front end forklift, bed lift and rear gate off-loading structure in combination for the purpose of animal carcass pickup and delivery for rendering. The motor vehicle includes a front end forklift, preferably an articulated type, which picks up designated carcass containers along a specified route for lift upward and rearward over the cab to dump the contents of the carcass container into the truck bed. The forklift is then brought forward and down to its carriage position. The truck bed includes a sliding roof which is slidable under indexing motor control to enable dumping entry into the truck bed, and then rearward movement of the slidable roof separates the truck bed interior from the elements. When all designated carcass containers have been encountered and emptied, the motor vehicle may proceed to a hauling truck to off-load the carcass supply. The truck bed may then be raised hydraulically upward and slightly rearward so that the moving floor mechanism within the truck bed can function to off-load carcasses rearward, down into the hauling vehicle. The hauling vehicle then takes the collected carcasses to a rendering plant for recovery of all animal fats and usable by-product. A central hydraulic system on the truck controls all functions from carcass container lift and lowering through truck bed lift, moving floor operation, and tailgate control.

Therefore, it is an object of the present invention to provide a carcass delivery vehicle for moving animal carcasses to a rendering plant.

It is also an object of the present invention to provide an improved carcass carrier that can rapidly pick up and deliver animal carcasses to an open bed semi-trailer for further conveyance to the rendering plant.

It is yet further an object of the present invention to provide a motor vehicle having a unique combination of individual pick up and bed manipulation functions which enable efficient carcass carrying capability.

It is another object of the present invention to provide a carcass carrying vehicle that is clean and efficient in carrying out the periodic delivery of fresh carcasses to a rendering installation for maximum recovery of by-product.

Finally, it is an object of the present invention to provide a carcass carrier vehicle that requires minimum maintenance and yet has maximum reliability in operation.

Other objects and advantages of the invention will be evident from the following detailed description when read in conjunction with the accompanying drawings which illustrate the invention.

DETAILED DESCRIPTION OF THE INVENTION

Historically the carcasses of dead farm animals, whether appearing occasionally in and around barnyards and pastures or in larger volume as you will find around animal feed lots and the like, have been disposed of by burying under earth. Often times lime was used by dusting the carcasses prior to covering up with earth in order to aid in decomposition and to minimize odors. Carcass disposal is a particular problem around poultry feed stations and hog and cattle feed lots where large volumes of animals are constantly being tended.

Newly developed procedures are aimed at gathering and processing of animal carcasses with a minimum of waste and maximum of efficiency. Such conservative procedure is particularly desirable around poultry feeding operations and hog and cattle feed lots. Animals are gathered periodically, time depending upon the size of the feeding lot or tending operation, and taken to a central processing plant for rendering whereupon the animal fats are removed as the carcasses are reduced to offal. After removal of fats, the offal may be further processed with relatively easier handling into any of a number of further by-products such as feeds, fertilizers and other specialized uses.

Figure 1:
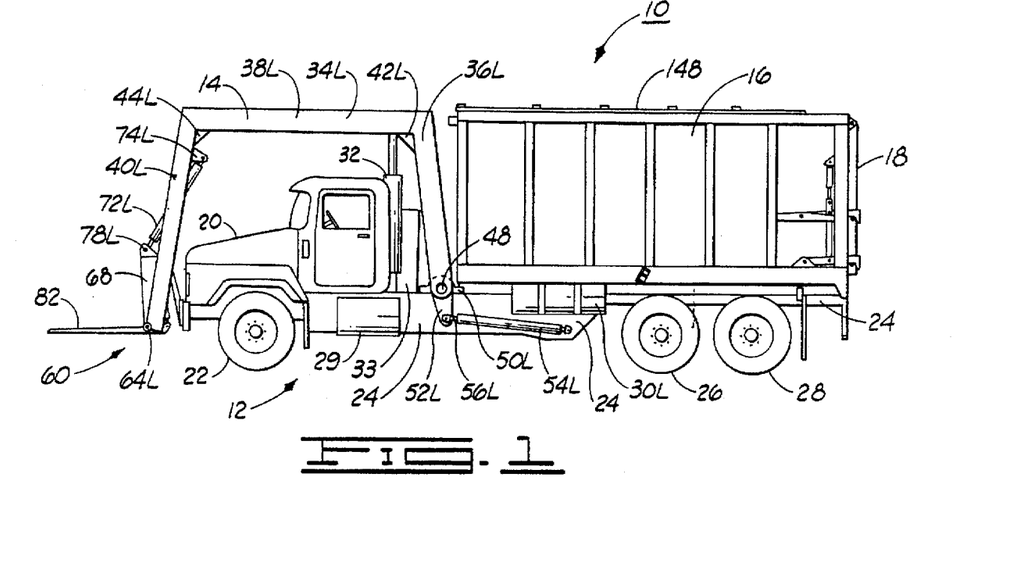
FIG. 1 is a side view in elevation of the carcass carrier vehicle.

Referring to FIG. 1, a carcass carrier 10 consists of a motor vehicle 12 which includes a front end forklift 14, and an elevatable truck bed 16 with a rear gate 18. The truck vehicle 12 is a standard form of commercially available truck body consisting of a forward cab and engine 20 having front wheels 22 as mounted on a longitudinal frame 24 which is supported rearwardly by tandem rear wheel assemblies 26 and 28. In the design shown, the truck vehicle 12 is a Mack R Model truck assembly; however, future design plans will designate a Model MR6905 cab-over type assembly.

The truck vehicle 12 includes a standard gas tank 29 and is outfitted with fifty gallon, cylindrical water tanks 30L and R as secured midframe on the flanks of frame 24. The exhaust assembly 32 (shown only in FIG. 1) is disposed behind the cab of truck vehicle 12 and between the arms of front end forklift 14 to allow freedom of lift operation, as will be further described below.

The front end forklift 14 consists of opposite side, inverted U arms 34L and 34R. See also FIG. 2. Each of U arms 34L and R consists of rear beams 36L and R, longitudinal beams 38L and R, and forward beams 40L and R interconnected in a U-shape as both the forward and rearward corners are joined at an angle of about 100° to the longitudinal beam 38L and R. Interior angle gussets 42L and R and 44L and R are weld secured to fortify the respective U arms 34L and R. A cross beam 46 is welded transversely between the vertical arms 40L and 40R to provide lateral strengthening.

The lower ends of rear beams 36L and R are secured, as by welding, to the opposite ends of a pivot axle 48 which is rotatably secured within opposite side bearing blocks 50L and R as secured on truck frame 24. Heavy plate lever arms 52L and R are then secured as by welding to the pivot axle 48 so that lever arms 52L and R are normally in the downward direction when the forklift 14 is in its downward or normal, inoperative position as shown in FIG. 1. Opposite side hydraulic cylinders 54L and R are then secured rearwardly on truck frame 24 while extending actuators 56L and R into pivotal affixture to respective lever arms 52L and R (see also FIG. 5). Thus, actuation of hydraulic cylinder 54L and R to extend respective actuator arms 56L and R moves respective lever arms 52L and R forward and upward to rotate pivot axle 48 and bring the opposite side U arms 34L and R upward and rearward to the dump position, as will be further described.

Figure 3:
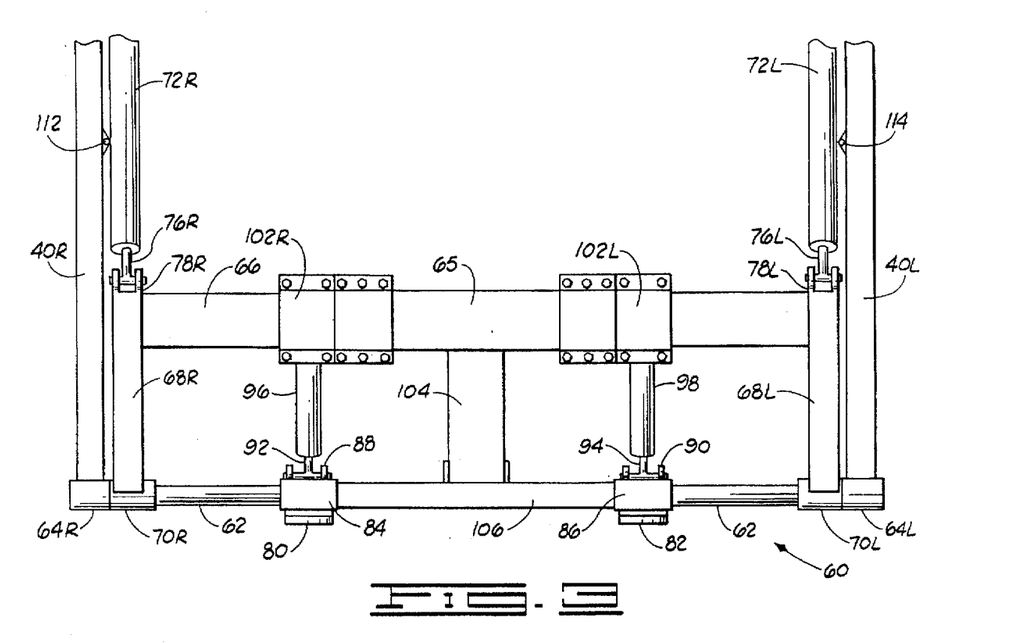
FIG. 3 is a front view in elevation of the forklift assembly of the overhead lift structure of the vehicle.
Figure 4:
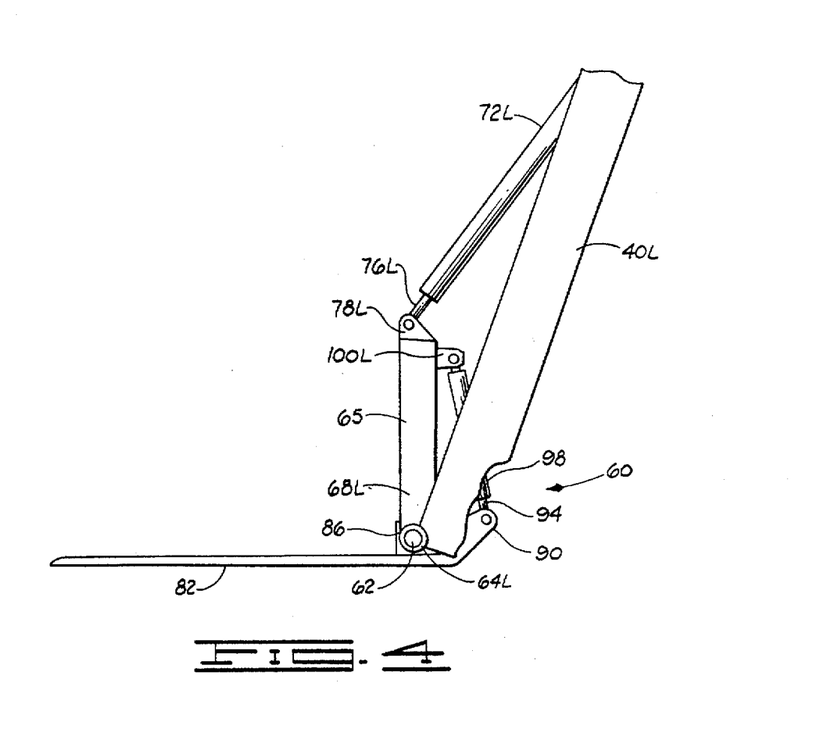
FIG. 4 is a side view in elevation of the forklift assembly as shown in FIG. 3.

The forklift 14 functions to move the fork assembly 60 upward and rearward over the cab to its dump position over truck bed 16. As shown also in FIGS. 3 and 4, the fork assembly 60 is carried on a transverse support axle 62 which is pivotally carried in pivot bearings 64L and R that are secured as by welding to the bottom end of the forklift downward beams 40L and R, respectively. A rectangular carrier frame 65 is formed by a transverse beam 66 as it is welded to opposite side frames 68L and 68R which terminate in sleeves 70L and R which are journaled on pivot bar 62 adjacent the respective pivot bearings 64L and 64R.

Figure 2:
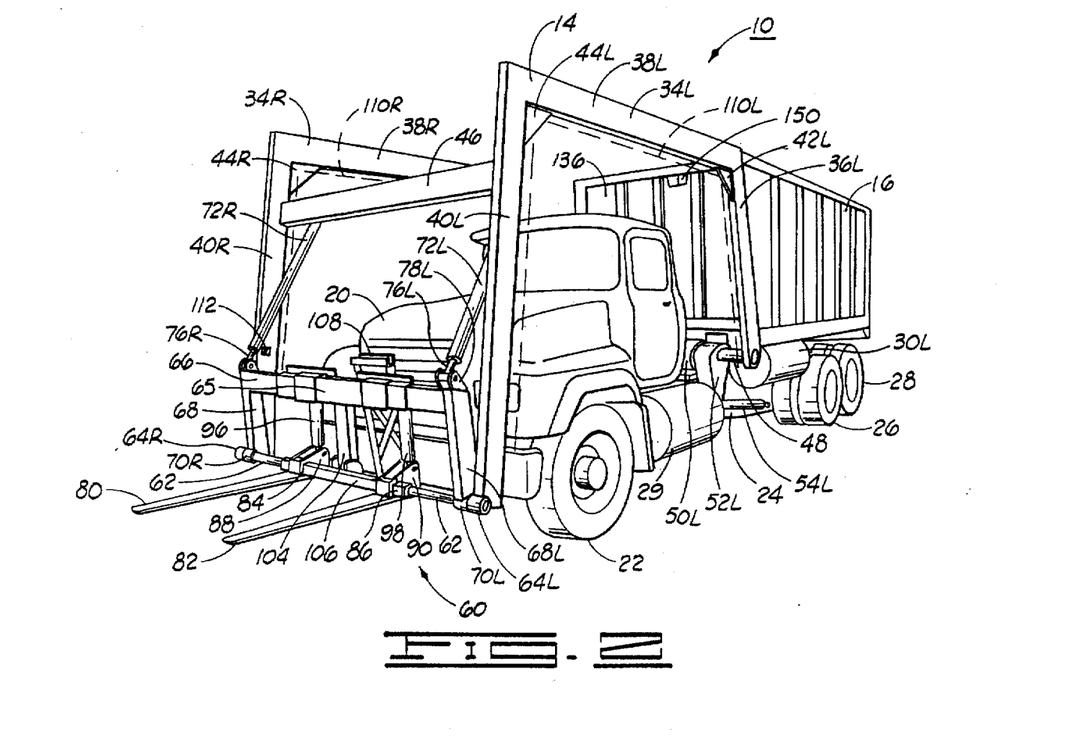
FIG. 2 is a front quarter perspective view of the vehicle.

The carrier frame 65 is controlled in attitude by means of hydraulic cylinders 72L and R which are secured to brackets 74L and R (FIG. 1) as welded behind opposite sides of transverse beam 46 (see FIG. 2). The respective hydraulic cylinder actuator rods 76L and R are then pivotally connected by means of clevis connections 78L and R that are formed on the upper ends of respective frame side bars 68L and R. Thus, actuation of cylinders 72 extends the respective rods 76 to rotate the carrier frame 65 about a transverse axis along pivot axle 62.

The forks 80 and 82 are also pivotally mounted on the pivot bar 62. Each of the forks 80 and 82 is secured to a respective pivot block 84 and 86 that is carried on the pivot axle 62. The pivot blocks 84 and 86 also extend respective pivot brackets 88 and 90 that are pivotally connected to respective actuator arms 92 and 94 of hydraulic cylinders 96 and 98. The upper ends of hydraulic cylinders 96 and 98 are pivotally affixed to respective brackets 100R and 100L affixed to the rear side of sleeve brackets 102R and 102L that are secured as by bolting around the transverse carrier frame bar 66. A central, vertical frame plate 104 is secured between transverse bar 66 and a point adjacent the center of pivot axle 62. A square tube 106 houses the pivot axle 62 as it extends between the fork brackets 84 and 86 and functions to brace against the central plate 104 when the forks 80 and 82 are under heavy load. A channel brace 108 (FIG. 2) secured upward from the front bumper of the truck vehicle 12 provides secure positioning of fork assembly 12 during road travel. The fork assembly 60 and attendant structure may be manually locked into the channel 108.

Referring to FIG. 2, the dash lines 110R and 110L represent a plurality of both fluid and oil transmission lines which provide flow direction up to the fork assembly 60. The dash line reference is made to alleviate drawing clutter since there are nine individual conduits routed around U arms 34R and L. Thus, there are high pressure fluid flow lines represented for conducting fluid from the hydraulic fluid supply 33 (FIG. 1) on truck frame 24 as fluid is conducted around the forklift U arms 34R and L to provide fluid connection to each of cylinders 72R and L, cylinder 96 and cylinder 98 to control forklift operation, as will be further described. In addition, water under pressure is pumped from respective water tanks 30R and L to respective spray heads 112 and 114 located on opposite forward beams 40L and R for directing spray into the open carrier box, as will also be further described below. The high pressure oil and reduced pressure water lines are easily interconnected with their source components and led forward around the forklift U arms 34R and L to deliver hydraulic oil and flush water at the proper pressures to the necessary actuator and spray units at fork assembly 60.

Figure 5:
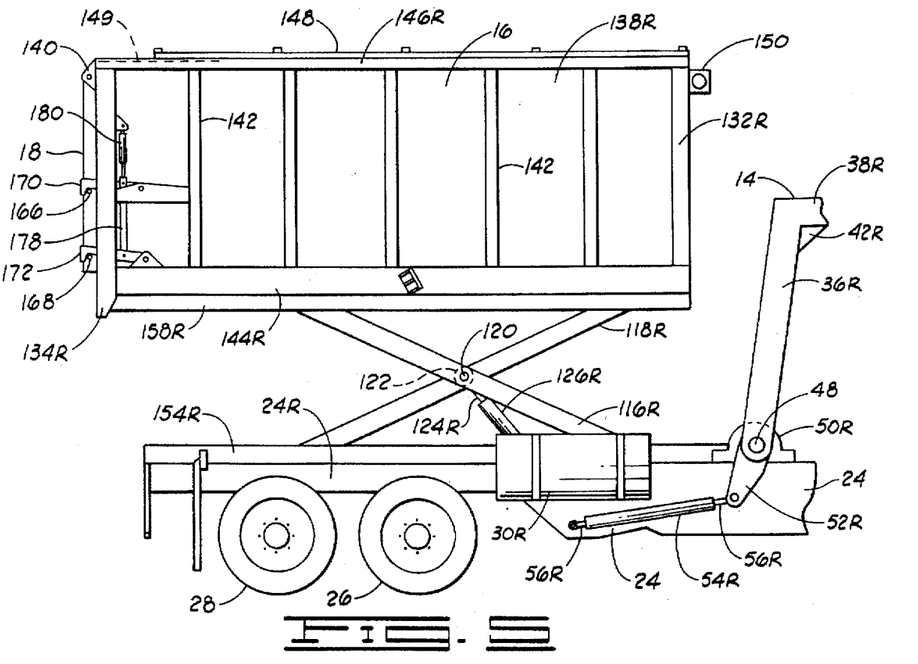
FIG. 5 is a rear view in elevation of the back portion of a carcass carriage vehicle with the truck bed partially raised.
Figure 6:
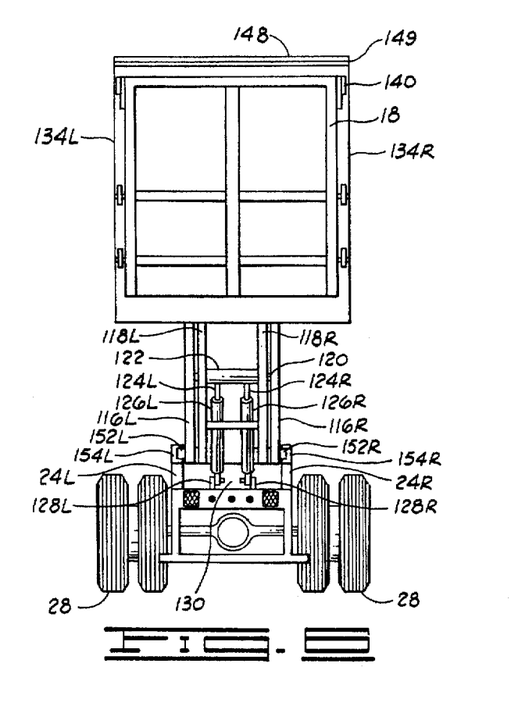
FIG. 6 is a rear view in elevation of the partially raised truck bed of FIG. 5.

Referring now to FIGS. 5 and 6, the elevatable truck bed 16 rests upon a pair of crossed scissor beams 116L and R and 118L and R. The respective pairs of beams 118 and 116 are supported on opposite ends of a pivot axle 120, and are separated by a bearing sleeve 122 which is connected on opposite sides to actuator arms 124L and R of hydraulic cylinders 126L and R. The lower ends of hydraulic cylinders 126L and R are pivotally connected to blocks 128L and R which are secured as by welding to a transverse beam 130 of truck frame 24.

The truck bed 16 is a steel panel, rectangular enclosure having front corner braces 132L and R and rear corner braces 134L and R which support a front panel 136 (FIG. 2), opposite side panels 138L and R, and the rear tailgate 18 which is pivotally supported across the top by pivot brackets 140. A plurality of upright panel braces 142 are utilized around the panels of truck bed 16 to provide necessary stiffening as required.

Longitudinal side rails 144R and 144L provide longitudinal support to truck bed 16 as do the upper side rails 146L and R. A steel panel 148 provides sliding cover to the interior of truck bed 16. A short section of permanent roof panel 149 is disposed across the rear end of the truck interior in sealing relationship to overlay of steel panel 148. The sliding cover 148, shown partially forward in FIGS. 8 and 9, is slidable longitudinally on truck bed 16 under control of a sprocket and chain mechanism (not shown) but as powered by an electric motor 150 located on the front center of front panel 136.

Figure 7:
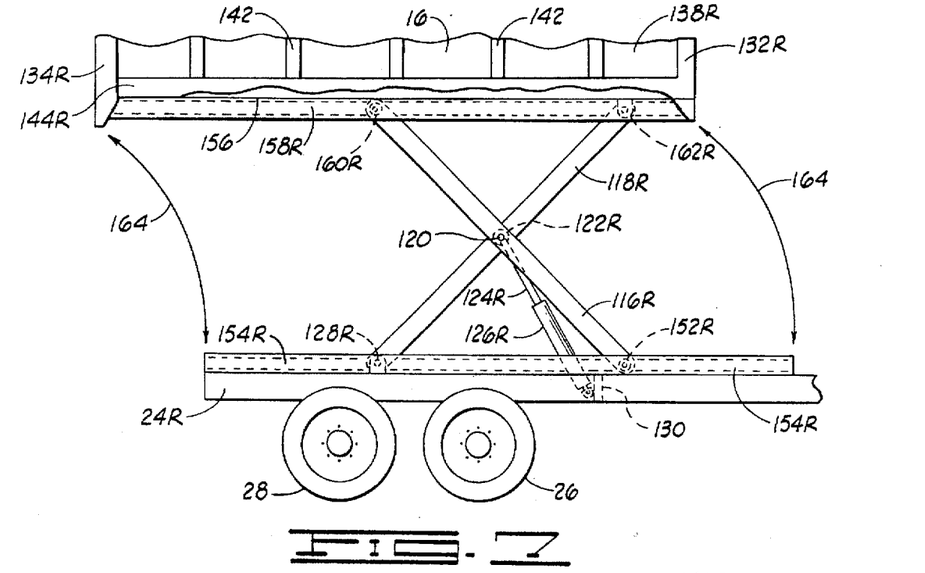
FIG. 7 is a side view in elevation of the rear portion of the carrier vehicle when the truck bed is completely raised.

Referring again to FIG. 6, the outer scissor beams 116L and R are supported by rollers 152L and R retained within longitudinal channels 154L and R which are secured as by welding along longitudinal frame members 24L and R with the channels facing inward. The upper ends of crossed scissor beams 116 and 118 are similarly engaged with rail structure secured along the outer bottom 156 of truck bed 16 as shown in FIG. 7, the fully raised truck bed view. Thus, a pair of spaced longitudinal channels 158L and 158R are suitably secured along the underside of truck bed outer bottom 156 so that the upper end of scissor beams 116L and R are supported in channels 158L and R by respective rollers 160L and R. The remaining scissor beams 118L and R are secured pivotally to a block 162L and R which are permanently secured as by welding at a position adjacent respective longitudinal rails 158L and R. Thus, with scissor beams 118L and R permanently affixed along respective lower channels 154L and R and upper channels 158L and R, and with scissor beams 116 supported by rollers 160 and 152 within respective channels 158L and R and lower channel 154L and R, raising of the truck bed 16 by extension of hydraulic cylinders 126L and R causes a rearward movement of truck bed 16, as traced by arrows 164.

Figure 8:
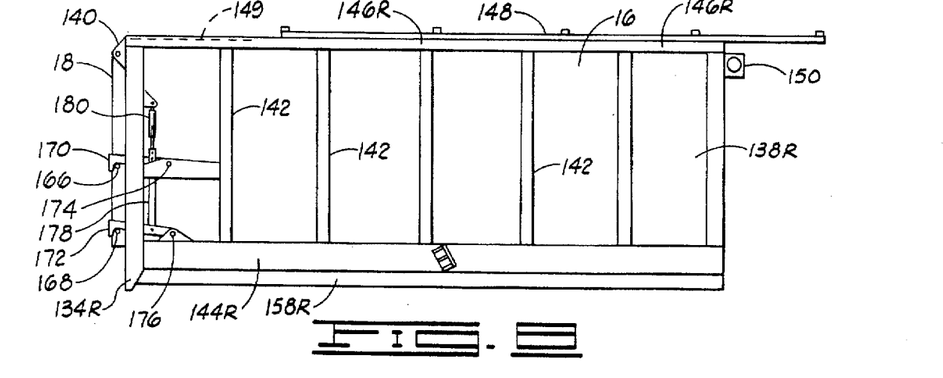
FIG. 8 is a side view in elevation of the truck bed of the present invention.

As shown in FIG. 8, the tailgate 18, as supported transversely from upper pivot fixtures 140, includes opposite side catch pins 166 and 168 which coact with respective opposite side latch arms 170 and 172 to maintain tailgate 18 closed. The parallel latch arms 170 and 172 are pivotally affixed at pivot points 174 and 176 disposed on members suitably welded to the rear truck bed panel structure. A vertical control rod 178 is then affixed to each of latch bars 170 and 172 as well as to the actuator rod end of a hydraulic cylinder 180. Thus, with cylinder 180 normally extended, the latch bars 170 and 172 are locked downward over latch pins 166 and 168; however, actuation of the cylinder 180 to contract the actuator rod raises the latch arms 170 and 172 to allow the tailgate 18 to open, as shown in FIG. 9. A hydraulic actuator 182 suitably secured inside the truck bed 16 may then be actuated to extend an actuator rod 184 to open the tailgate 18 vertically upward to allow off-loading of the carcass load.

Figure 9:
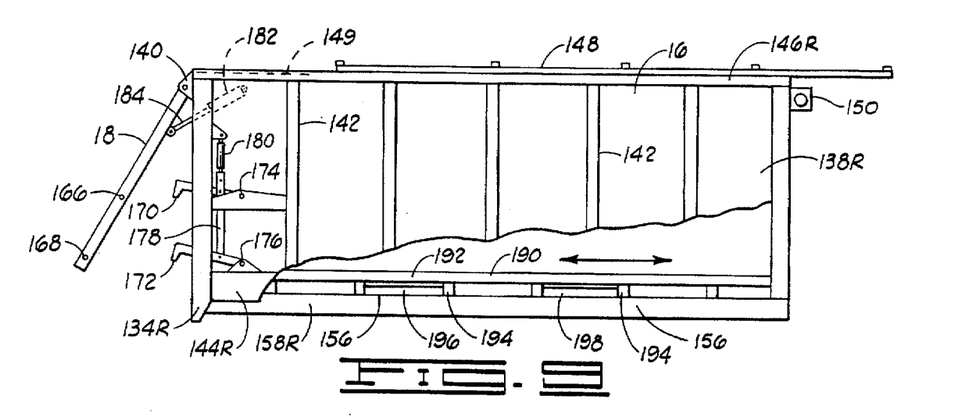
FIG. 9 is a side view in elevation of the truck bed with tailgate open and the moving floor shown in cutaway.

The cutaway showing of FIG. 9 illustrates the moving floor capabilities of trailer bed 16. Moving floor 190 is what is known as a Hallco live floor that is commercially available from Hallco Manufacturing Co., Inc. of Seattle, Wash. The moving floor 190 consists of a plurality of longitudinal slats 192 which extend across the width of truck bed 16 as supported on transverse base beams 194. Separate banks of hydraulic actuators 196 and 198 then coact to move individual ones of the plurality of slats 192 to move the carcass cargo rearward towards the tailgate 18. The moving floor is powered by six hydraulic cylinders which move selected ones of the deck slats 192 incrementally in succession thereby to move any fungible cargo. For example, with a large plurality of longitudinal deck slats, the hydraulic cylinders move every third slat a short direction towards the exit door, then the cylinders move the slat adjacent every third slat in like manner, then the cylinders move every third slat remaining by the same increment, and then all slats retract to the start position to recommence the three step slat movement. This movement is repeated rapidly to move cargo goods along the route of advancement.

Figure 10:
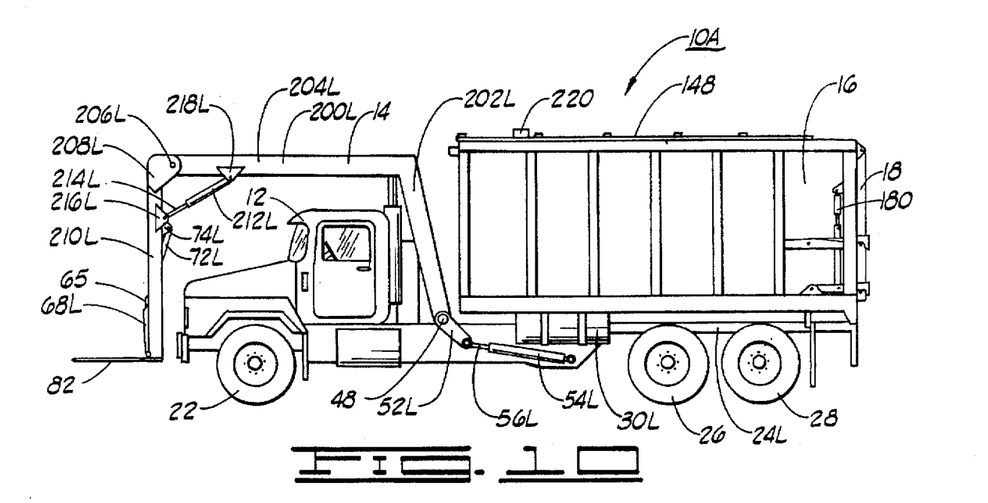
FIG. 10 is a side view of the carrier vehicle showing a preferred form of articulated forklift assembly.

Referring to FIG. 10, a preferred form of carcass carrier 10A includes an articulated forklift 14 that enables more versatile usage and stowage for road travel. The forklift 14 consists of opposite side angle beams 200L and R having the rear end leg 202L and R connected to opposite sides of the pivot axle 48 while the longitudinal front end leg 204L and R extends at an angle of about 130° over the cab of the truck vehicle 12. The front leg 204L is then connected by means of pivot pins 206L and R to respective elbow plates 208L and R which are secured as by welding to the vertical beams 210L and R.

Articulative movement is controlled by hydraulic cylinders 212L and R extending actuating arms 214L and R. The cylinder assemblies are connected between bracket plates 216L and R and 218L and R which are welded to respective vertical beams 210L and R and longitudinal front legs 204L and R. The remainder of the forklift assembly is the same structure as shown in FIG. 2 with a rectangular carrier frame 65 including side frames 68L and R attitude control by hydraulic cylinders 72L and R. In FIG. 10, the vertical beams 210L and R have been articulated to the full vertical position, the carrier box pickup attitude, as will be further described below.

Figure 11:
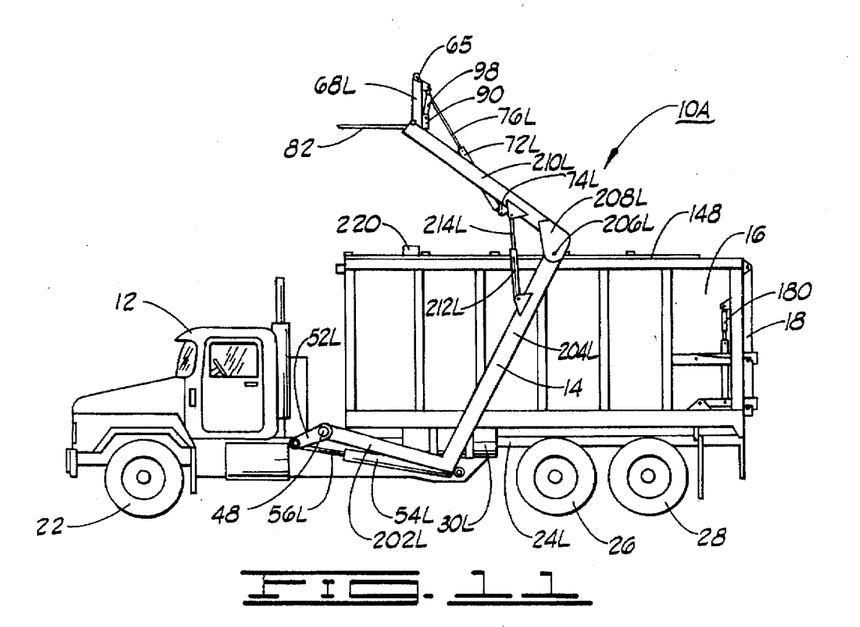
FIG. 11 is a side view of the carrier vehicle with the preferred form of forklift in the raised position.

In FIG. 11, the pivot axle 48 has been rotated to rotate the forklift 14 to place the rectangular carrier frame 65 at its most vertical position. In this position, the carrier frame 65 carries the carcass box (to be described) as supported on the forks 80 and 82 (see FIG. 2). In this intermediate position, the hydraulic cylinders 212L and R have fully extended their respective actuator rods 214L and R. In this attitude, the forklift 14 can proceed to carry its traverse fully rearward for dumping of the carrier box.

Figure 12:
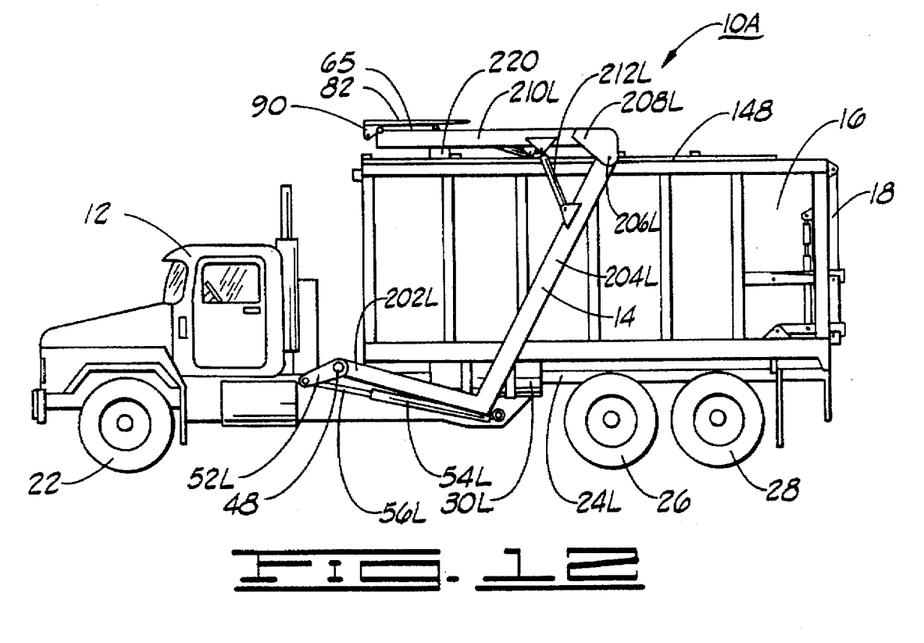
FIG. 12 is a side view of the carrier vehicle with the preferred form of forklift in the travel ready position.

In FIG. 12, the forklift 14 has been articulated to the stowage position where the carrier frame 65 rests downward on a cushion block 220 that is secured on top of truck bed 16. In this attitude, truck travel causes much less stress on hydraulic systems while also increasing safety by a considerable margin. The hydraulic cylinders 212L and R are retracted to close vertical beams 210L and R, and the hydraulic pistons 96 and 98 (FIG. 4) are extended while hydraulic cylinders 72L and R are retracted to draw in the carrier frame 65 and forks 80 and 82. The carrier frame 65 rests on top of cushion box 220; however, for long trips it may be desirable to securely fasten the carrier frame 65 and vertical beams 210L and R in the position shown in FIG. 12.

Figure 13:
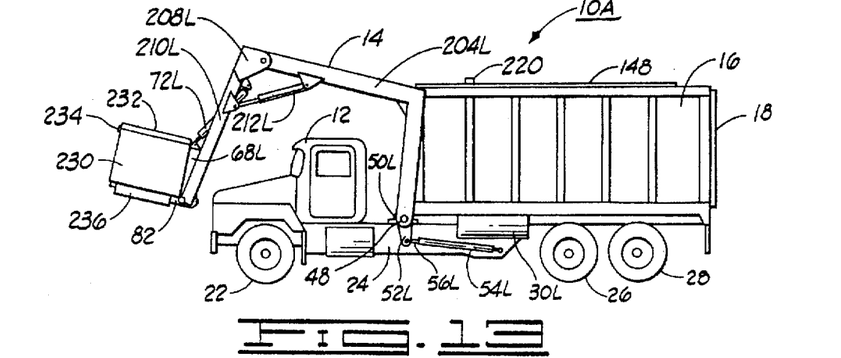
FIG. 13 is a side view of the carrier vehicle in operation at the initial phase of carcass container lift.
Figure 14:
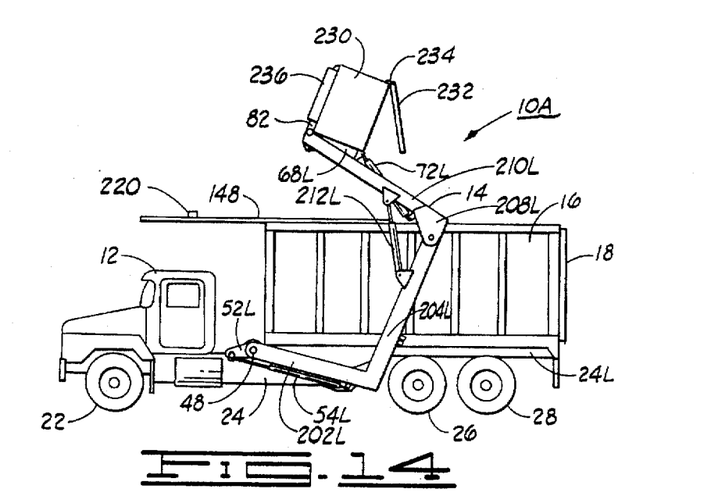
FIG. 14 is a side view in elevation of the carcass carrier vehicle with the carcass lift assembly at maximum raised or dump position.
Figure 15:
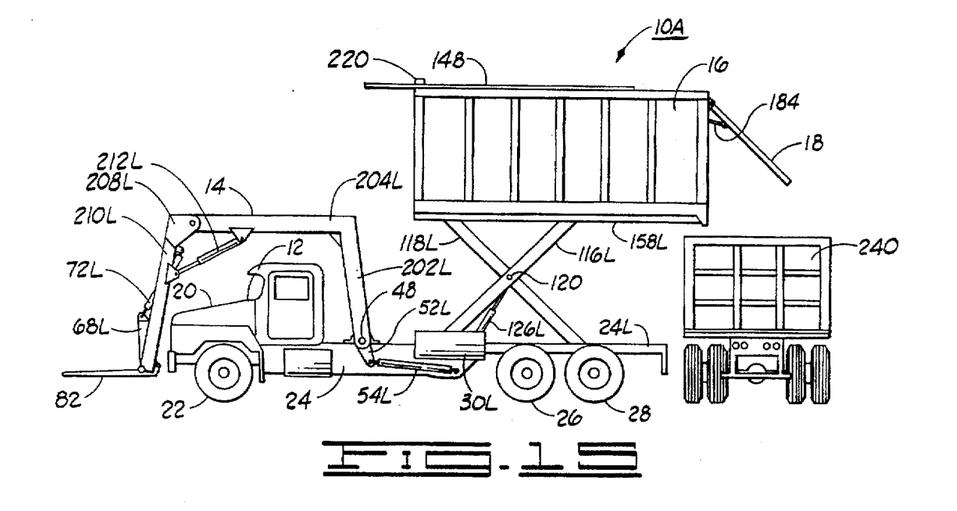
FIG. 15 is a side view of the carcass carrier vehicle with truck bed raised to off-load position.

For full discussion of the operation of the present invention major reference is made to FIGS. 13, 14 and 15 with other figures as indicated. It is the purpose of the carcass carrier 10A to attend to appointed rounds where collected carcasses are periodically stored. Such route position would have one or more collection boxes 230 which have a lid 232 and lid hinge 234 along one side, as a solid base member 236 provides a pair of parallel channels for receiving the fork tines 80 and 82. After the carcass carrier 10A has made its rounds and collected carcass material from all collector boxes 230, the carrier 10A then moves to a designated location wherein a larger open bed truck 240 (FIG. 15) awaits carcasses delivered from all route carriers to then subsequently haul the carcass material to the rendering plant.

The carcass carrier 10A in normal road-ready attitude would appear as that of FIG. 12 with the exception that the hydraulic cylinders 96 and 98 (FIG. 3) would be extended to raise forks 80 and 82 fully upward, and the carrier frame 65 would be interlocked on the cushion block 220 on top of steel panel 148. The carcass carrier 10A is then stabilized and road ready.

When the carcass carrier 10A arrives at the first collection point, he will then release the carrier frame 65 and operate the forklift 14 to the forward position (FIG. 10) whereupon cylinders 96 and 98 contract actuator arms 92 and 94 thereby to lower the forks 80 and 82 into operative, forward pointing position as shown in FIG. 2. The operator can then steer the motor vehicle 12 to maneuver the forks 80 and 82 into the respective channel ways in base 236 of carcass container 230.

Referring again to FIG. 13, the operator can begin hydraulic actuation of cylinders 54L and R to extend respective actuator arms 56L and R thereby to rotate lever arms 52L and R and, therefore, to rotate pivot axle 48 so that forklift 14 moves the collector box 230 upward and rearward toward the position shown in FIG. 14. Meanwhile, the bed cover panel 148 will have been actuated to move forward under control of electric motor 150 (FIG. 8) and, when forklift 14 reaches its rearmost traverse (FIG. 14) the box lid 232 falls open and the carcass contents of collector box 230 drop into the truck bed 16. At this time, wash water and sanitizer from tanks 30L and R are applied through conduits 110L and R to the spray heads 112 and 114 which flush out the collector box 200 while it is in its inverted position as shown in FIG. 14.

It should be noted that the hydraulic cylinders 72L and R (FIGS. 3 and 4) tend to actuate with the rods 76L and R gradually elongating during lifting of forklift 14 up to an apogee position. That is, the hydraulic cylinders 72L and R tend to keep the collector box 230 relatively upright during the lifting phase and then the cylinders 72L and R are retracted to tilt the control box 230 over rearward for the dump operation as shown in FIG. 14. Once all collector stations have been visited and all control boxes 236 raised and dumped, the carcass carrier 10A is conditioned for road ready and the driver proceeds to the collection station where the larger open bed truck 240 awaits carcass material.

Referring to FIG. 15, the carcass carrier 10A may be backed up to position the rear of carcass carrier 10A adjacent the side of truck bed 240 whereupon the primary lift hydraulic cylinders 126L and R are energized to elongate respective actuator arms 124L and R forcing sleeve 122 and axle 120 upward while extending the crossed beams 116L and R and 118L and R to an openmost position as shown in FIG. 7. The truck bed 16 has raised to its topmost position and, by virtue of the positive pivot engagement of the opposite ends of beams 118L and R as they are pivotally affixed at blocks 128L and R and the upper blocks 162L and R, the truck bed 16 tends to swing rearward along an arcuate path shown by arrow lines 164 (FIG. 7). When truck bed 16 is fully raised (FIG. 15) the truck operator can then back the carcass carrier 10 so that the tailgate 18 is totally over the open bed truck 240. At this time then the operator can actuate hydraulic cylinders 180 (FIG. 9) to release latch bars 170 and 172 and open tailgate 18, and actuation of hydraulic cylinder 182 to extend the actuator rod 184 will open the tailgate 18 upward and maintain it in an open position. The operator can then energize the hydraulics controlling the moving floor 190 so that it will move the carcass cargo rearward within truck bed 16 to drop the carcasses out and downward into the open bed truck 240. When the open bed truck 240 has made all of its appointed collections, it then proceeds to the rendering plant for final delivery of the carcasses.

The foregoing discloses a novel form of animal carcass handling vehicle which enables fast and reliable carcass handling from feed station to rendering plant. The vehicle utilizes a unique combination of implementing features including novel forklift structure, rear bed elevation and closure apparatus, and coordinated moving floor that function to provide safe and efficient carcass handling capabilities.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A specialized vehicle having a combination of operative elements for receiving and transporting animal carcasses, comprising:
    a truck vehicle including an operating cab and engine mounted on the front end of an elongated wheeled frame having front and rear ends;
    a forklift assembly which includes:
        first and second U-shaped arms each having front and rear ends with the U-shaped arms' rear end pivotally mounted on opposite sides of the wheeled frame behind an adjacent said operating cab, and with said U-shaped arms' front end extending to a point in front of the operating cab;
        a fork frame pivotally mounted between said U-shaped arms' front end and pivotal about a transverse axis; and
        at least two forks pivotally supported on said fork frame;
    first means for controlling the position of said first and second U-shaped arms which include:
        first hydraulic means connected between said wheeled frame and each of said first and second U-shaped arms and actuatable to rotate said U-shaped arms in unison;
        second hydraulic means actuatable to rotate said fork frame about said transverse axis; and third hydraulic means actuatable to rotate said forks relative to said fork frame;
    a scissor beam support frame secured on said elongated wheeled frame rear end, said scissor beam support frame being controllable between a lower horizontal position and an upwardly extended, elevated position;
    a truck bed having front and side walls and a tailgate, said truck bed being affixed on said support frame and movable between said lower horizontal position and said elevated position;
    second means for controlling said truck bed elevation; fourth hydraulic means for releasing and raising the truck bed tailgate; and
    a moving floor disposed in said truck bed actuatable to incrementally off-load rearwardly through said tailgate.

2. A specialized vehicle as set forth in claim 1 wherein said scissor beam support frame comprises:
    a pair of first channel members secured in parallel and longitudinally on said elongated wheeled frame rear end with opposed channels facing inward;
    a pair of second channel members secured in parallel and longitudinally beneath said truck bed with opposed channels facing inward; and
    a pair of laterally spaced scissor beams each comprising first and second beams which are of equal length and pivotally connected to each other approximate the midpoints thereof, said first and second beams each having first and second ends with said first beam first ends engaged with respective first channel members and said first beam second ends engaged with respective second channel members, and with said second beam first ends engaged with respective second channel members and said second beam second ends engaged with respective first channel members.

3. A specialized vehicle as set forth in claim 2 which further includes:

a transverse pivot axle secured between said spaced scissor beams at said midpoints thereof.

4. A specialized vehicle as set forth in claim 3 which further includes:

fifth hydraulic means connected between said elongated wheeled frame and said transverse pivot axle and actuatable to raise and lower said scissor beam support frame and said truck bed.

5. A specialized vehicle as set forth in claim 2 which further includes:

first rollers secured on said first beam first ends and each slidably engaged within respective first channel members; and second rollers secured on said first beam second ends and each slidably engaged within respective second channel members;

whereby raising of said truck bed on said scissor beam support frame also moves the truck bed rearward as said second beams are pivotally anchored relative to said first and second channel members.

6. A specialized vehicle as set forth in claim 1 wherein said truck bed further includes:

a forward slidable roof which is actuatable to provide an opening in vertical alignment with a rearward position of the forklift.

7. A specialized vehicle as set forth in claim 1 wherein said forklift assembly further comprises:

a pivot axle disposed across said truck vehicle and connecting said first and second U-shaped arm rear ends;

opposite side bearing blocks secured on said wheeled frame and pivotally supporting said first axle; and opposite side lever arms secured perpendicular to said respective U-shaped arm rear ends and being responsive to said first means for controlling the position of said first and second U-shaped arms.

8. A specialized vehicle as set forth in claim 7 which further includes:

a liquid supply tank secured on said wheeled frame; and first and second spray heads mounted on respective first and second U-shaped arm front ends adjacent and directed toward said forklift and connected to said liquid supply tank.

9. A specialized vehicle as set forth in claim 1 wherein said forklift assembly comprises:

first and second angle beams forming said first and second U-shaped arm rear ends pivotally mounted behind said cab and extending therefrom to a point over the front of the cab;

first and second vertical beams each having first and second ends with the second ends pivotally affixed to a respective one of said first and second angle beams and the first ends having said forklift secured thereto; and first and second hydraulic cylinders connected between respective first and second vertical beams and first and second angle beams and actuatable to control angular attitude of said first and second U-shaped arms.

10. A specialized vehicle as set forth in claim 9 wherein:

said first means for controlling the position of said first and second U-shaped arms is actuated to place the first and second U-shaped arms in a rearward position; and said first and second hydraulic cylinders are actuated to place the first and second vertical beams in a most rearward position to rest securely on said truck bed.

11. A specialized vehicle as set forth in claim 10 which further includes:

a forward slidable roof which is actuatable to provide an opening in said truck bed; and a cushion block mounted on said roof to support said first and second vertical beams.

12. A specialized vehicle having a combination of operative elements comprising:

a truck vehicle including an operating cab and engine mounted on the front end of an elongated wheeled frame having front and rear ends;

an articulated forklift assembly consisting of first and second angle beams each having front ends and rear ends with the rear ends pivotally mounted behind the cab on opposite sides of the frame and the front ends extending to a point forward of the operating cab, and first and second vertical beams having upper and lower ends with upper ends pivotally secured about a transverse axis to respective first and second angle beam front ends;

a forklift affixed to said first and second vertical beam lower ends;

a fork frame pivotally mounted on a transverse axis between said first and second vertical beam lower ends;

at least two forks pivotally mounted about a transverse axis supported on said fork frame;

first and second hydraulic cylinders connected between respective first and second angle beam front ends and the adjoining vertical beams to control the relative attitude of said vertical beams;

means for controlling the position of said first and second angle beams as they traverse in unison with the angle beams moving the forklift between a normal position in front of the cab to a rearward position over the rear end of said elongated wheeled frame, said means for controlling consisting of first hydraulic means connected between said wheeled frame and each of said first and second angle beams and actuable to rotate said angle beams and vertical beams in unison, second hydraulic means actuatable to rotate said fork frame about a transverse axis, and third hydraulic means actuatable to rotate said fork members relative to said fork frame; and a truck bed having front and side walls and a tailgate, said truck bed being affixed on said elongated wheeled frame.

13. A specialized vehicle as set forth in claim 12 which further includes:

a scissor beam support frame secured on the rear end of said wheeled frame in support of said truck bed; and hydraulic lift means secured between said truck bed and said wheeled frame and actuatable to raise said truck bed relative to said wheeled frame.

14. A specialized vehicle as set forth in claim 13 which further includes:

a moving floor disposed in said truck bed actuatable to incrementally off-load rearwardly toward said tailgate.

15. A specialized vehicle as set forth in claim 12 which further includes:

a moving floor disposed in said truck bed actuatable to incrementally off-load rearwardly toward said tailgate.

* * * * *